T. DURNBAUGH.
DUST CATCHER FOR GAS PIPES.
APPLICATION FILED JAN. 7, 1910.
987,559.
Patented Mar. 21, 1911.
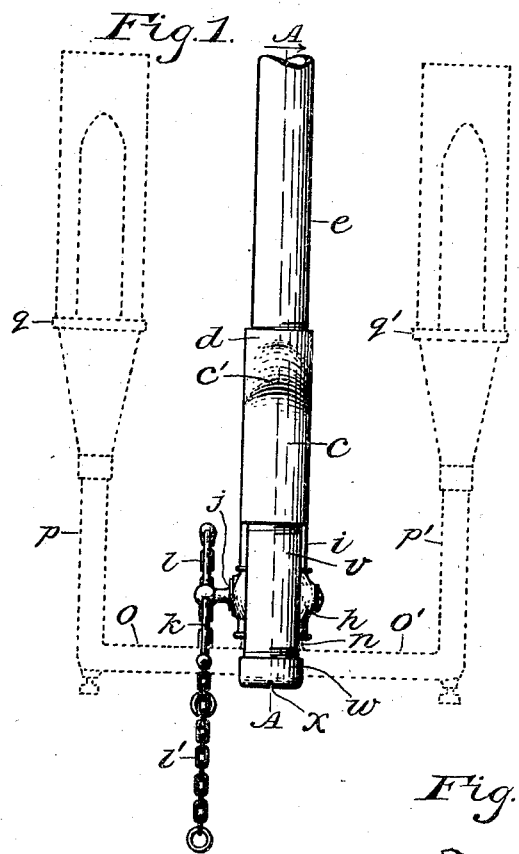
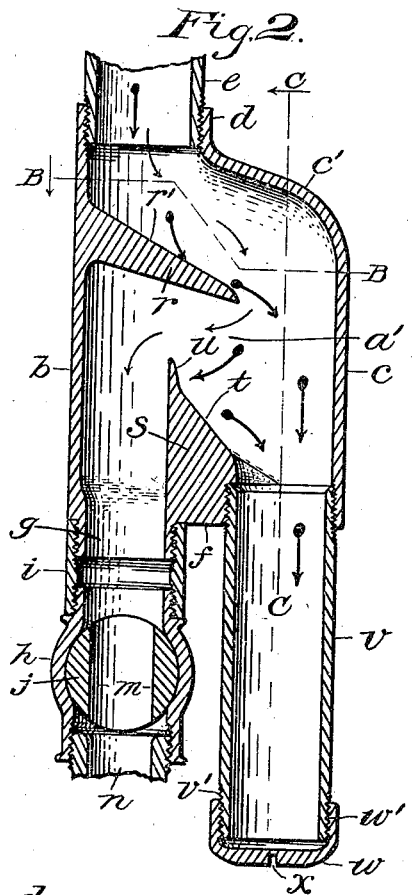
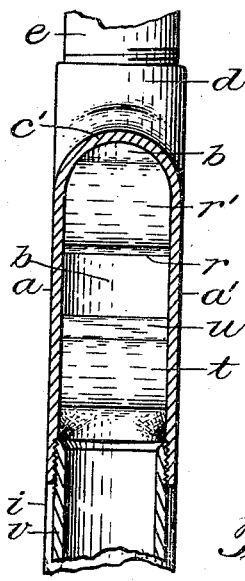
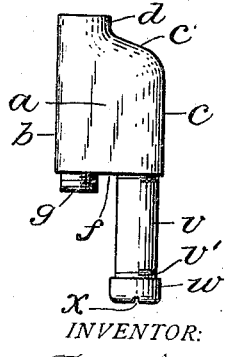
WITNESSES:
J. H. Gardner
K. R. Woddell
INVENTOR:
Truman Durnbaugh
BY
E. T. Silvius,
ATTORNEY.

UNITED STATES PATENT OFFICE.

TRUMAN DURNBAUGH, OF WABASH, INDIANA.

DUST-CATCHER FOR GAS-PIPES.

987,559. Specification of Letters Patent. Patented Mar. 21, 1911.

Application filed January 7, 1910. Serial No. 536,937.

*To all whom it may concern:*

Be it known that I, TRUMAN DURNBAUGH, a citizen of the United States, residing at Wabash, in the county of Wabash and State of Indiana, have invented certain new and useful Improvements in Dust-Catchers for Gas-Pipes; and I do declare the following to be a full, clear, and exact description of the invention, reference being had to the accompanying drawings, and to the letters and figures of reference marked thereon, which form a part of this specification.

This invention relates to devices for trapping and holding sedimentary or other matter that may be present in pipes through which fluid or liquid may be conducted, the invention having reference more particularly to a device for catching and retaining rust, scale or dust in gas-pipes.

The object of the invention is to provide a neat appearing and cheaply constructed trap or dust catcher of the above-mentioned character that will be effective in preventing dust or similar matter, especially in gas-pipes, from entering connecting valves or feed tubes or burners of lamps connected with the pipes; a further object being to provide an improved dust catcher by the use of which trouble and expense, resulting from the dust or rust falling from the walls of the pipes into the valves, may be avoided in an economical manner and which permits ready removal of the dust that may accumulate, and thereby eliminates expenses for repairs for disconnecting the pipes to clear them.

With the above-mentioned and other objects in view, the invention consists in an improved gravity trap comprising a separating box having a reservoir and provided with a deflector for deflecting the dust or other foreign matter into the reservoir, and provided also with a barrier to arrest particles of the matter that may be drawn by the flowing gas partially into its channels, the gas channel in the separating box being circuitous.

The invention consists further in the parts and combinations and arrangements of parts as hereinafter particularly described and then defined in the appended claims.

Referring to the drawings Figure 1 is an elevation of the improved dust catcher in connection with a drop pipe and the dual gas lamp, the latter being indicated by broken lines as illustrative of one of the applications of the invention for practical purposes; Fig. 2, a vertical section of the dust catcher on the line A A in Fig. 1; Fig. 3, a horizontal section approximately on the line B B in Fig. 2; Fig. 4, a fragmentary vertical section on the plane of the line C C in Fig. 2; and Fig. 5, a side elevation of the improved dust catcher.

Similar reference characters in the several figures of the drawings indicate like parts or features of construction herein referred to.

The improved dust catcher is illustrated and usually used in connection with substantially vertical pipes, but it is apparent that it may be used in other than vertical position, and it comprises a separating box preferably consisting of two flat vertical sides $a$ and $a'$ and curved ends $b$ and $c$, the end $b$ being substantially straight vertically and the end $c$ mainly straight vertically and having a curved upper portion $c'$ extending over toward the end $d$, so as to form a top for the box from which a flange extends upward and joins the end $b$ to constitute a neck $d$ suitably adapted to be connected to a pipe $e$ through which gas may be conducted into the upper portion of the separating box. The separating box has a bottom part $f$ at the middle portion of the lower ends of the sides $a$ or $a'$ and a nipple $g$ extending downward from the bottom, being formed partially thereon and partially as an extension of the end $b$ to provide an outlet for the gas from the separating box, the nipple being adapted to have a valve body $h$ suitably connected thereto as by means of a pipe coupling $i$, it being desirable to arrange the valve for controlling the flow of the gas near to the separating box, the valve-body $h$ having a rotary valve plug $j$ therein provided with an operating handle-bar $k$ to which operating chains $l$ and $l'$ are connected as is customary, the plug having a passageway $m$ therein through which the gas may flow, a pipe $n$ being connected to the valve-body $h$ to receive and conduct the gas. The pipe $n$ may be a part of a gas lamp and have horizontal feed-pipes $o$ and $o'$ connected thereto that have upright branches $p$ and $p'$ respectively on which are mounted lamp burners $q$ and $q'$, respectively.

The upper portion of the separating box is provided with a deflector $r$ that extends from the end $b$ along the inner side of the sides $a$ and $a'$ below the neck $b$ and toward the end $c$, the deflector having an inclined upper side $r'$ that slopes downward toward the end $c$ so that gas entering the neck must pass over away from the end $b$ toward the end $c$ and may then return under the deflector to the end $b$ in its outward flow, and so that dust falling from the pipe $e$ or carried therefrom by the flowing gas will be deflected over toward the end $c$ and fall by the force of gravity toward the bottom of the separating box. A barrier $s$ extends upward from the bottom $f$ along the inner sides of the sides $a$ and $a'$ toward the deflector $r$ a suitable distance and has a sloping or inclined upper side $t$ adapted to guide dust or other foreign matter that may fall thereon over toward the end $c$, the upper end of the barrier having a relatively thin lip $u$ thereon that is adapted to prevent the lighter weight dust or finer particles that may fall on the upper portion of the inclined side $t$ from being drawn over the top of the barrier with the flowing gas, the face of the lip that is presented toward the end $c$ being nearly vertical, so that the dust can not be drawn upward against it and over the top of the lip with the usual rate of flow of the gas, but must gravitate down to the sloping side $t$ on which it must slide or roll into a tubular reservoir $v$ that is connected to the separating box and extends downward beyond the bottom thereof, the reservoir being connected partially to the bottom and partially to the end $c$, the lower end of the reservoir having external screw-threads $v'$ thereon whereby a cap $w$ having internal screw-threads $w'$ is connected detachably to the body of the reservoir, the cap having a slot $x$ therein adapted to receive a screw driver whereby to loosen the cap if required. As will be seen by reference to Fig. 2 the deflector $r$ extends from the end $b$ toward the end $c$ considerably beyond the lip $u$ of the barrier and a clear passage is provided from the end of the deflector down into the reservoir.

In practical use when the dust catcher is arranged uprightly as shown, the gas or other fluid or liquid will flow from the pipe $e$ as indicated by the lighter appearing arrows toward the end $c$ and around under the deflector and over the lip of the barrier toward the end $b$ and out through the nipple $g$ without carrying foreign matter that might lodge in the valve or lamp burners or passages, the heavier matter such as dust or the like being deflected by the inclined side $r'$, of the deflector from which it must fall by gravity into the reservoir $b$, the barrier arresting any of the lighter particles that may be carried over slightly toward the end $b$ and deflecting them into the reservoir from which accumulations may readily be removed after having removed the cap $w$, the course of the dust or the like being indicated by the heavier appearing arrows. It will be seen that in some cases the dust separator may be arranged with its end $c$ undermost either horizontally or slightly inclined, so that sedimentary matter may flow by gravity into the reservoir, the invention being useful in separating foreign matter from liquid as well as from gaseous fluid.

Having thus described the invention, what is claimed as new, is—

1. In a dust-catcher, the combination of a separating-box comprising two sides and two relatively narrow ends and also a bottom and a top forming a chamber, there being an inlet in the top and an outlet in the bottom, a reservoir comprising a tube connected with and extending beyond said bottom and a closure screwed to the end of the tube, a deflector in the separating-box opposite the inlet, and a barrier on said bottom in a plane between said outlet and said tube and extending toward said deflector, said barrier being inclined on one side from the top of said tube upward, the opposite side of said barrier being in alinement with the nearer side of said outlet.

2. In a dust-catcher, the combination of a separating-box comprising two sides and two relatively narrow ends and also a bottom and a top forming a chamber, there being an inlet in the top and an outlet in the bottom, a reservoir consisting of a tube screwed into said bottom and a cap screwed onto the end of the tube, a deflector in the separating-box opposite the inlet, and a barrier on said bottom in a plane between said outlet and said tube, the barrier being inclined on one side from the top of the said tube upward, said barrier having a lip on its upper end that has an inclined side extending from the inclined side of the barrier at an obtuse angle thereto.

In testimony whereof, I affix my signature in presence of two witnesses.

TRUMAN DURNBAUGH.

Witnesses:
MERLE DURNBAUGH,
WILLIAM C. KIRKWOOD.